United States Patent
Shen

(10) Patent No.: US 9,108,574 B1
(45) Date of Patent: Aug. 18, 2015

(54) REAR-MOUNTED BICYCLE CARRYING RACK FOR A VEHICLE

(71) Applicant: Shih-Chieh Shen, Taichung (TW)

(72) Inventor: Shih-Chieh Shen, Taichung (TW)

( * ) Notice: Subject to any disclaimer, the term of this patent is extended or adjusted under 35 U.S.C. 154(b) by 0 days.

(21) Appl. No.: 14/530,328

(22) Filed: Oct. 31, 2014

(51) Int. Cl.
*B60R 9/10* (2006.01)
*B60R 9/06* (2006.01)

(52) U.S. Cl.
CPC ... *B60R 9/10* (2013.01); *B60R 9/06* (2013.01); *Y10S 224/924* (2013.01)

(58) Field of Classification Search
CPC .......... B60R 9/06; B60R 9/10; Y10S 224/924
USPC ......... 224/497, 503, 504–508, 523, 529, 532, 224/533, 572, 314, 324, 319
See application file for complete search history.

(56) References Cited

U.S. PATENT DOCUMENTS

| | | | | |
|---|---|---|---|---|
| 4,709,840 A | * | 12/1987 | Allen | 224/314 |
| 5,118,020 A | * | 6/1992 | Piretti | 224/493 |
| 5,135,145 A | * | 8/1992 | Hannes et al. | 224/493 |
| 5,495,970 A | * | 3/1996 | Pedrini | 224/314 |
| 6,386,407 B1 | * | 5/2002 | Erickson et al. | 224/282 |
| 7,118,016 B1 | * | 10/2006 | Kolda | 224/500 |
| 7,434,714 B2 | * | 10/2008 | Huang | 224/497 |
| 7,857,179 B1 | * | 12/2010 | Allen et al. | 224/504 |
| 8,109,422 B2 | * | 2/2012 | Murray | 224/314 |
| 8,636,184 B2 | * | 1/2014 | Allen et al. | 224/497 |
| 2002/0047031 A1 | * | 4/2002 | Ferman | 224/497 |
| 2002/0096546 A1 | * | 7/2002 | Bogoslofski | 224/497 |

FOREIGN PATENT DOCUMENTS

TW        201217207 A1    5/2012

* cited by examiner

*Primary Examiner* — Brian D Nash
*Assistant Examiner* — Corey Skurdal
(74) *Attorney, Agent, or Firm* — Muncy, Geissler, Olds & Lowe, P.C.

(57) ABSTRACT

A rear-mounted bicycle carrying rack for a vehicle is provided, including a base, two supporting racks, two supporting arms, two upper prop racks and a lower prop rack. The two supporting racks and the lower prop rack are pivoted to the base respectively, and the two supporting racks are swingable relative to each other to be V-shaped. The two supporting arms and the two upper prop racks are pivoted to an end of the two supporting racks respectively relative to the base and are behind the two supporting racks. When the two supporting arms swings upward and forward, the upper prop rack is pushed to swing backward, the two supporting arms abut against the two supporting racks to make the two supporting arms and the two upper prop racks extend forward and backward respectively, and the lower prop rack swings backward.

9 Claims, 9 Drawing Sheets

REAR-MOUNTED BICYCLE CARRYING RACK FOR A VEHICLE

BACKGROUND OF THE INVENTION

1. Field of the Invention

The present invention relates to a bicycle carrying rack for a vehicle, and more particularly to a rear-mounted bicycle carrying rack for a vehicle.

2. Description of the Prior Art

The conventional bicycle carrying racks for a vehicle are mounted on the top, side or rear of a vehicle, and rear-mounted bicycle carrying rack is more space-saving and user-friendly, so it is popular among users.

As a bicycle carrier disclosed in TW 201217207, a structure which is foldable and expandable is provided; however, the structure has many disadvantages. First, a supporting arm propping backward on a rear of a car and a supporting arm extending forward to carry a bicycle are the same object; therefore, even when the bicycle carrier is folded, a length of the supporting arm is still long and unable to be shortened, and a height of the bicycle carrier folded is still considerable. Second, a supporting rack supporting the supporting arm tends to face downward normally, so to maintain the supporting rack upward, a positioning mechanism is required. The structure of the bicycle carrier is inconvenient to operate, and it can be influenced by gravity and be damaged.

The present invention is, therefore, arisen to obviate or at least mitigate the above-mentioned disadvantages.

SUMMARY OF THE INVENTION

The main object of the present invention is to provide a bicycle carrying rack which has strong structural strength and is easy to operate.

To achieve the above and other objects, a rear-mounted bicycle carrying rack for a vehicle of the present invention is provided, including a base, two supporting racks, a lower prop rack, two supporting arms and two upper prop racks.

The base has a front side and a rear side, and a connection between the front side and the rear side defines a first direction. The front side of the base has at least one first pivoting portion, and the rear side of the base has at least one second pivoting portion.

An end of each supporting rack is pivoted to the first pivoting portion, and the other end of each supporting rack has a third pivoting portion. Each supporting rack is swingable about a first pivoting axle around the first pivoting portion, and the first pivoting axle is parallel to the first direction. The two supporting racks pivotally swing on the same plane, and the two supporting racks movably change between a first state which the two supporting racks gather together and are parallel to each other and a second state which the two supporting racks split and have an included angle therebetween. When the two supporting racks are in the first state, each supporting rack is substantially vertical. When the two supporting racks are in the second state, an included angle is formed between each supporting rack and a horizontal plane.

An end of the lower prop rack is pivoted to the second pivoting portion and swingable about a second pivoting axle relative to the base between a vertical position and an open position, and the other end of the lower prop rack has a lower prop portion. When the lower prop rack is in the vertical position, the lower prop rack is above the base and is vertical to the base. When the lower prop rack is in the open position, the lower prop portion is behind the second pivoting axle in a predetermined distance.

An end of each supporting arm is pivoted to the third pivoting portion of one of the supporting racks and is swingable between a close position and an operating position. The end of each supporting arm near the third pivoting portion has a propping portion and a pushing portion. When the supporting arm is in the close position, the supporting arm is behind the supporting rack. When the supporting arm pivotally swings from the close position to the operating position, the supporting arm is in front of the supporting rack, and the abutting portion abuts against the supporting rack so that the supporting arm extends forward and is unswingable.

An end of each upper prop rack is pivoted to the third pivoting portion of one of the supporting rack and swingable between a beginning position and a passive position, and the other end of each upper prop rack has an upper prop portion. When the upper prop rack is in the beginning position and the supporting arm is in the close position, the upper prop rack is located between the supporting arm and the supporting rack. When the supporting arm pivotally swings forward to make the pushing portion abut against the upper prop rack, the upper prop rack starts to be abutted and pushed by the supporting arm and swing toward the passive position. When the supporting arm is in the operating position, the upper prop rack is in the passive position and extends backward. When the supporting arm is in the operating position and the upper prop rack is in the passive position, the supporting arm and the upper prop rack are nonlinearly located.

Thereby, the rear-mounted bicycle carrying rack for a vehicle of the present invention has preferable structural strength because the two supporting arms are supported by the supporting rack. The upper prop rack and the supporting arm are independent and can be positioned in parallel, so a height of the bicycle carrying rack after folded can be largely lowered. In addition, the present invention uses the weight of a bicycle to make each member positioned; therefore, there is no need of extra positioning mechanism, and it is easier to operate.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 6A is a partially-enlarged view of FIG. 6.

DETAILED DESCRIPTION OF THE PREFERRED EMBODIMENTS

Figure 1:
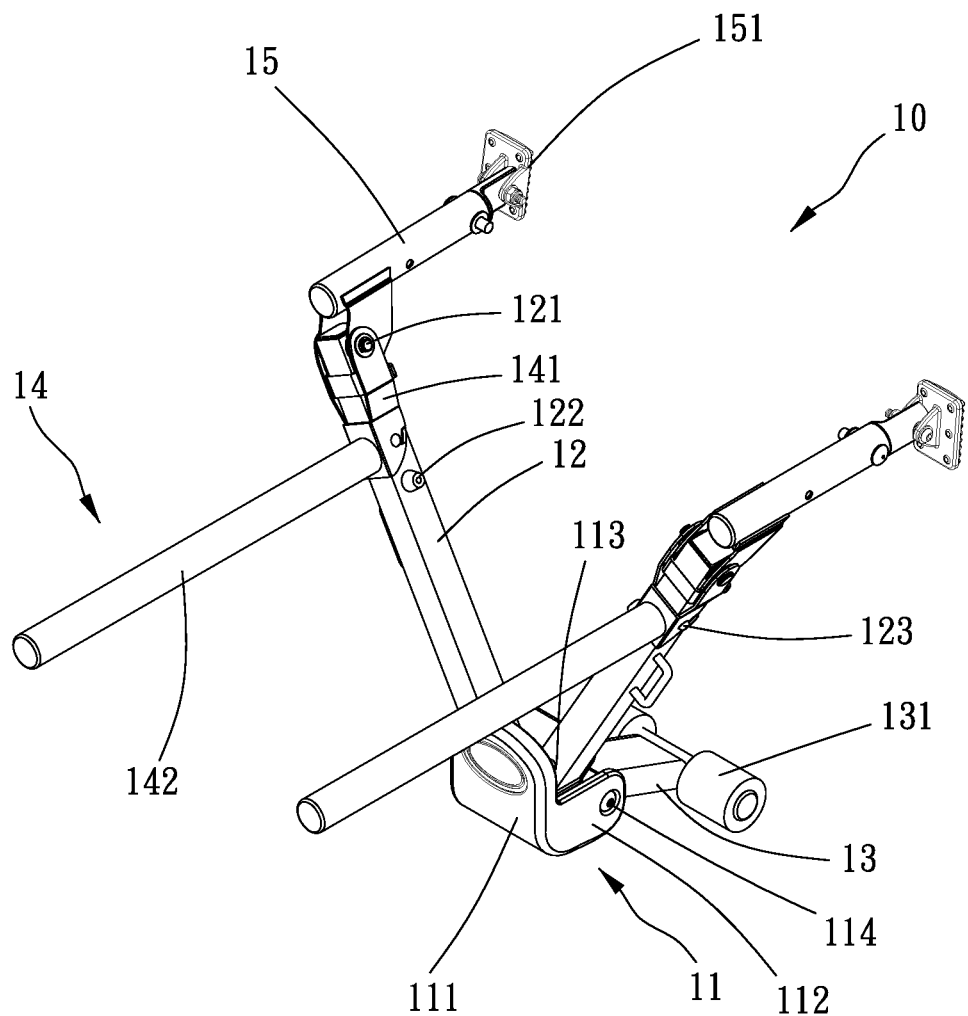
FIG. 1 is a stereogram of the present invention in an unfolded state.

Please refer to FIGS. 1 to 9, FIG. 4A and FIG. 6A for a rear-mounted bicycle carrying rack for a vehicle 10 of the present invention. The rear-mounted bicycle carrying rack for a vehicle 10 is provided for being mounted on a rear of a car 20 and for at least one bicycle 30 to be arranged thereon. The rear-mounted bicycle carrying rack for a vehicle 10 includes a base 11, two supporting racks 12, a lower prop rack 13, two supporting arms 14 and two upper prop racks 15.

The base 11 has a front side and a rear side, and a connection between the front side and the rear side defines a first direction. The front side of the base 11 has at least one first pivoting portion 113, and the rear side of the base 11 has at least one second pivoting portion 114. In this embodiment, the base 11 has a front wall 111 and two lateral walls 112 connected to the front wall 111 respectively. The front wall 111 and the two lateral walls 112 form a receiving space. The first pivoting portion 113 is disposed on a face of the front wall 111 facing the receiving space, and the second pivoting portion 114 is connected between the two lateral walls 112, wherein each face of each lateral wall 112 facing the receiving space is provided with a blocking portion, and preferably, the blocking portion is positioned on a top edge of each lateral wall 112.

An end of each supporting rack 12 is pivoted to the first pivoting portion 113, and the other end of each supporting rack 12 has a third pivoting portion 121. Each supporting rack 12 is swingable about a first pivoting axle around the first pivoting portion 113, and the first pivoting axle is parallel to the first direction. The two supporting racks 12 are swingable on the same plane, and the two supporting racks 12 movably change between a first state which the two supporting racks 12 gather together and are parallel to each other and a second state which the two supporting racks 12 split and have an included angle therebetween. When the two supporting racks 12 are in the first state, each supporting rack 12 is substantially vertical. When the two supporting racks 12 are in the second state, an included angle is formed between each supporting rack 12 and a horizontal plane. In this embodiment, when the two supporting racks 12 are in the second state, lower outer lateral faces of the two supporting racks 12 abut against the two blocking portions respectively and are unswingable so as to restrict a largest swinging angle of the two supporting racks 12. In addition, a face of each supporting rack 12 facing the other supporting rack 12 has a positioning member 122, and the two supporting racks 12 are fixable with each other via the two positioning members 122 and positioned. On the other hand, an outer wall of each supporting rack 12 is protrudingly formed with an elastic engaging member 123. More specifically, the supporting rack 12 is hollow and tubular and has a hole on the outer wall thereof. The elastic engaging member 123 is disposed in the supporting rack 12, and a head portion of the elastic engaging member 123 protrudes outside the hole. Therefore, when the elastic engaging member 123 is pressed inward by a force, it slightly retreats. When the force is removed from the elastic engaging member 123, the elastic engaging member 123 tends to expand outward.

An end of the lower prop rack 13 is pivoted to the second pivoting portion 114 and swingable about a second pivoting axle relative to the base 11 between a vertical position and an open position, the other end of the lower prop rack 13 has a lower prop portion 131. When the lower prop rack 13 is in the vertical position, the lower prop rack 13 is above the base 11 and is vertical to the base 11. When the lower prop rack 13 is in the open position, the lower prop portion 13 is behind the second pivoting portion 114 in a predetermined distance.

An end of each supporting arm 14 is pivoted to the third pivoting portion 121 of one of the supporting rack 12 and swingable between a close position and an operating position. The end of each supporting arm 14 near the third pivoting portion 121 has a propping portion 143 and a pushing portion 144. When the supporting arm 14 is in the close position, the supporting arm 14 is behind the supporting rack 12. When the supporting arm 14 swings forward from the close position to the operating position, the supporting arm 14 is in front of the supporting rack 12, and the propping portion 143 abuts against the supporting rack 12 so that the supporting arm 14 extends forward and is unswingable. In this embodiment, each supporting arm 14 is substantially L-shaped and includes an abutting section 141 and an extending section 142, and the abutting section 141 is pivoted to the third pivoting portion 121. When the supporting arm 14 is in the close position, the abutting section 141 is substantially perpendicular to the supporting rack 12, the extending section 142 is substantially parallel to the supporting rack 12, and the propping portion 143 and the pushing portion 144 are positioned within the abutting section 141. Preferably, the abutting section 141 of the supporting arm 14 includes three sequentially connected abutting walls, and the three abutting walls form a receiving space whose opening is opposite to the extending section 142. The abutting wall in the middle is formed with the propping portion 143, and at least one of the other two abutting walls has a fixing portion 145. The fixing portion 145 includes a guiding sheet 1451 and a fixing hole 1452, and the guiding sheet 1451 is slanted. When the supporting arm 14 is moved to the operating position, the elastic engaging member 123 is pressed by the guiding sheet 1451 and temporarily retreats and enters the fixing hole 1452 so as to allow the supporting arm 14 and the supporting rack 12 to be fixed with each other.

An end of each upper prop rack 15 is pivoted to the third pivoting portion 121 of one of the supporting rack 12 and swingable between a beginning position and a passive position, and the other end of each upper prop rack 15 has an upper prop portion 151. When the upper prop rack 15 is in the beginning position and the supporting arm 14 is in the close position, the upper prop rack 15 is located between the supporting arm 14 and the supporting rack 12. When the supporting arm 14 swings forward to make the pushing portion 144 to push and abut against the upper prop rack 15, the upper prop rack 15 starts to be pushed and abutted against by the supporting arm 14 and swing toward the passive position. When the supporting arm 14 is in the operating position, the upper prop rack 15 is in the passive position and extends backward. When the supporting arm 14 is in the operating position and the upper prop rack 15 is in the passive position, the supporting arm 14 and the upper prop rack 15 are nonlinearly located. In this embodiment, when the supporting arm 14 is in the operating position and the upper prop rack 15 is in the passive position, the supporting arm 14 and the upper prop rack 15 are substantially parallel to each other, but a position of the supporting arm 14 is lower than a position of the upper prop rack 15. On the other hand, two sides of each upper prop rack 15 are provided with an ear portion 152 respectively, and the ear portion 152 is provided for the pushing portion 144 of the supporting arm 14 to push and abut thereagainst so as to make the upper prop rack 15 swing upward. In addition, the upper prop portion 151 of each upper prop rack 15 is swingably disposed at the end of the upper prop rack 15 remote from the third pivoting portion 121.

Figure 2:
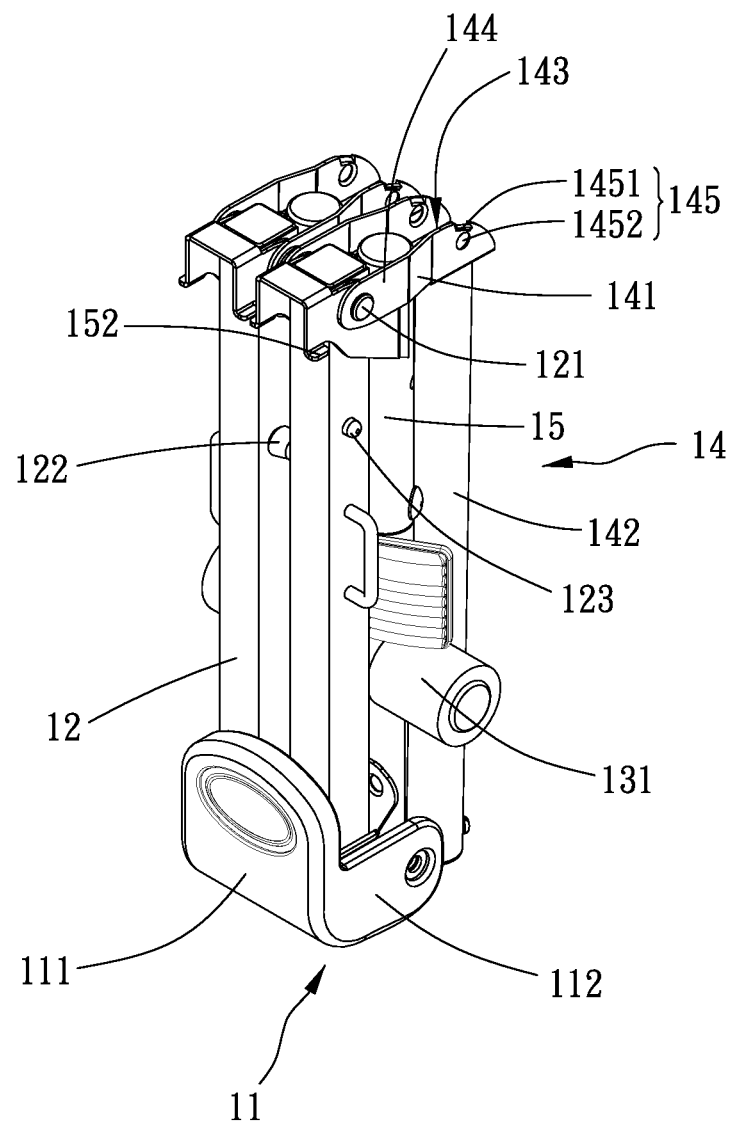
FIG. 2 is a stereogram of the present invention in a folded state.

Please refer to FIG. 2. In actual use, when the present invention is folded, the two supporting racks 12 are in the first state (the two positioning members 122 are mutually positioned), the lower prop rack 13 is in the vertical position, each supporting arm 14 is in the close position, and each upper prop rack 15 is in the beginning position; therefore, each supporting rack 12, each supporting arm 14, each upper prop rack 15 and the lower prop rack 13 are parallel to one another and right above the base 11.

Figure 3:
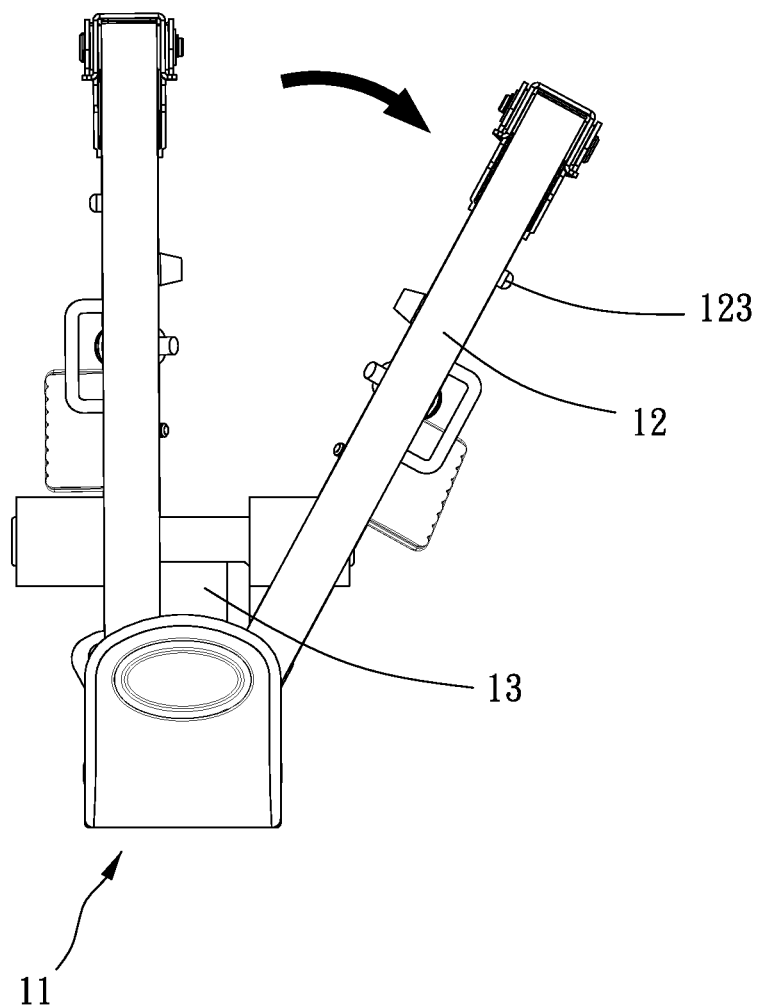
FIG. 3 is a front view showing the present invention in use.

Please further refer to FIG. 3. Each supporting rack 12 swings outward to be in the second state (in FIGS. 3 to 6, only one of the supporting racks is taken as a representative interpretation) so as to allow an included angle to be formed between the supporting rack 12 and the horizontal plane.

Figure 4A:
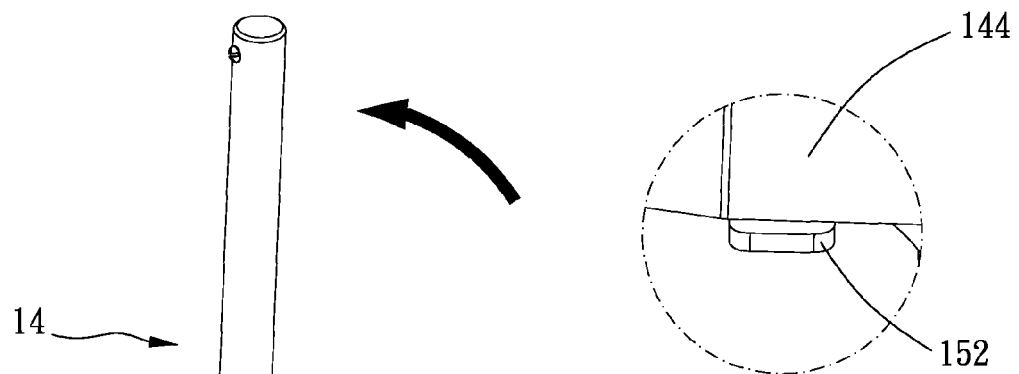
FIG. 4A is a partially-enlarged view of FIG. 4.
Figure 4:
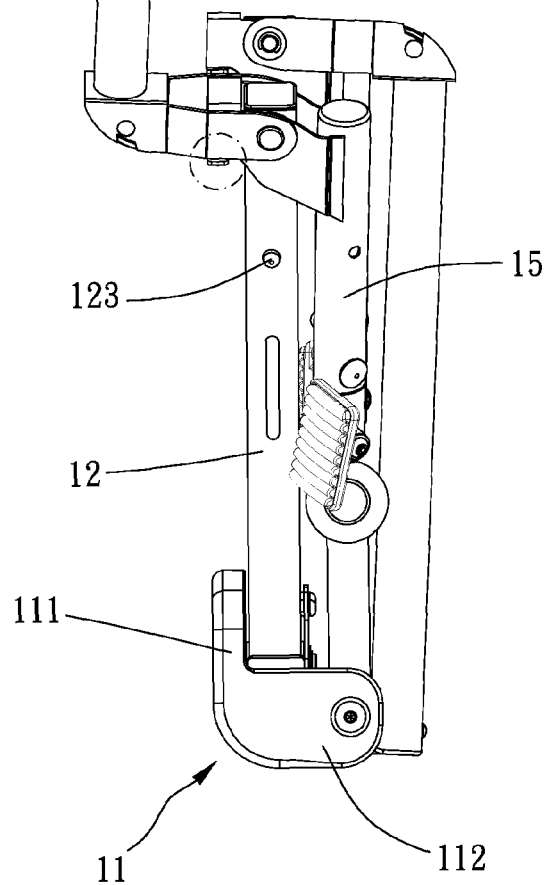
FIGS. 4 to 7 are side views showing the present invention in use.
Figure 5:
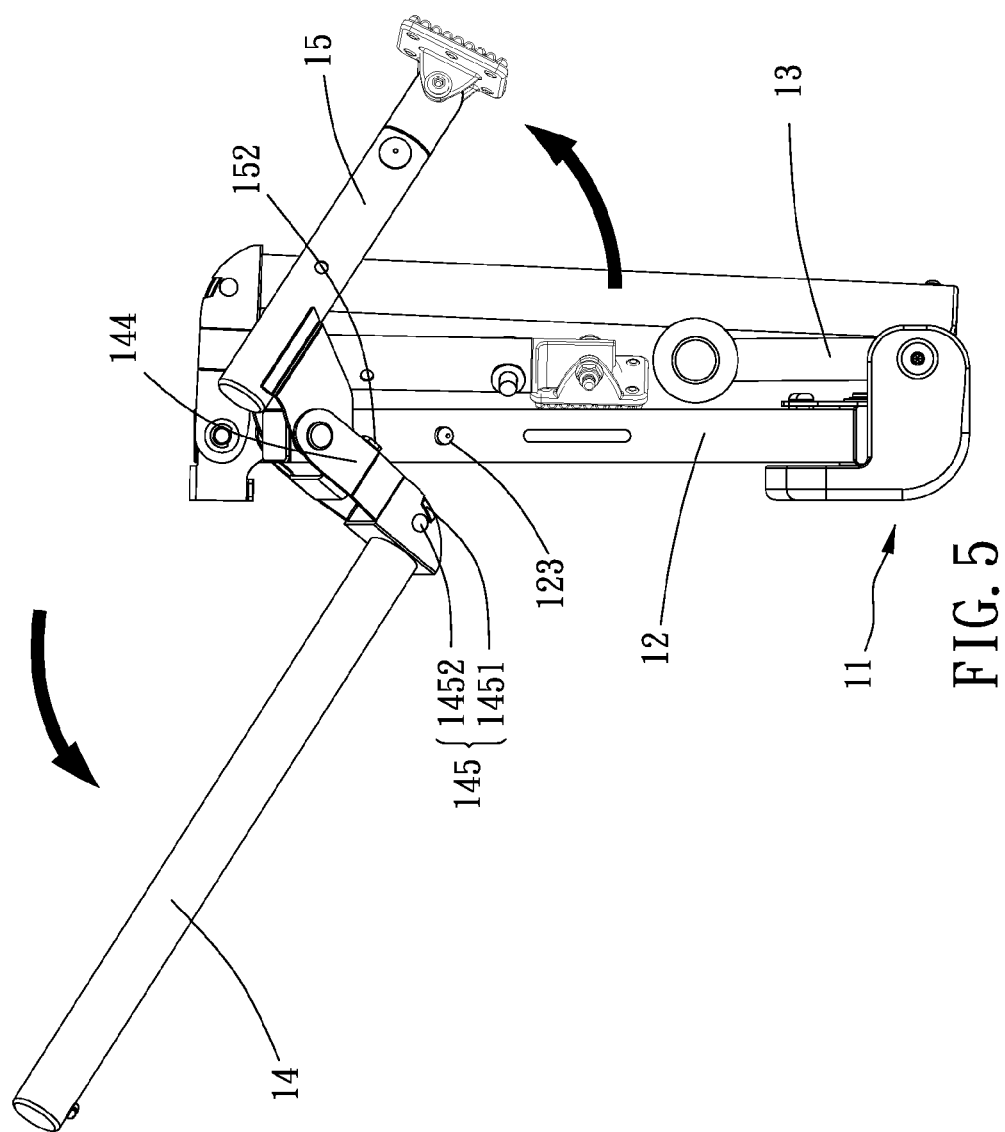
Figure 6:
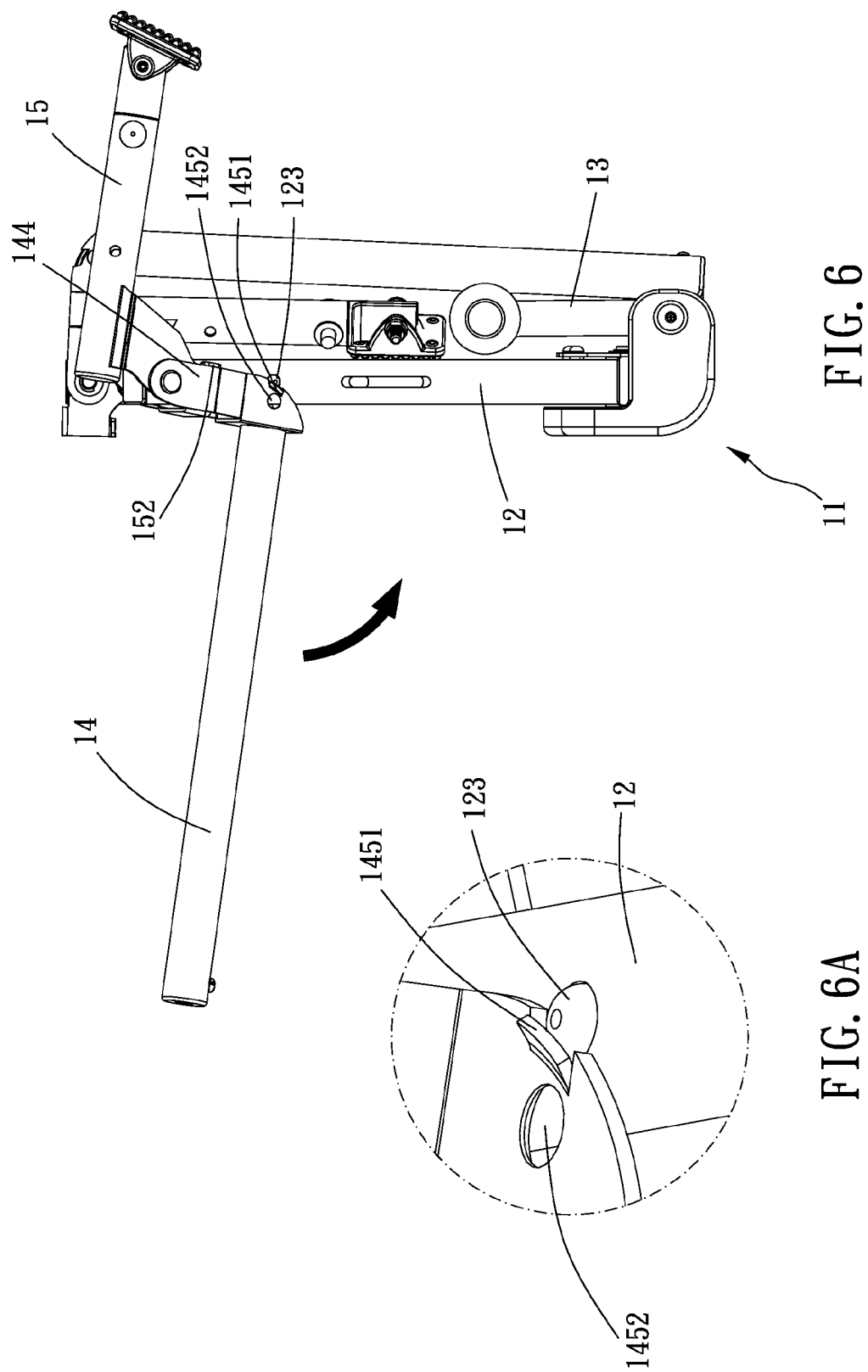
Figure 7:
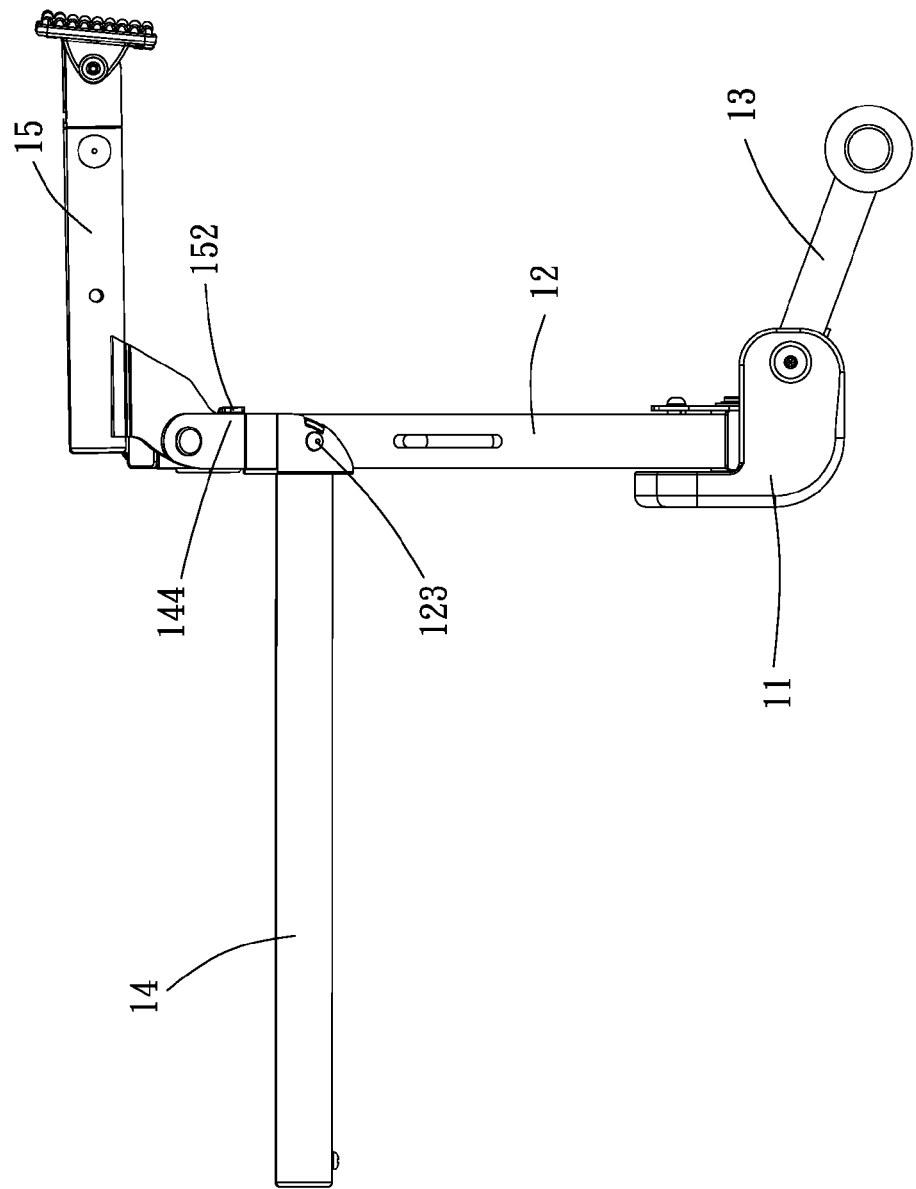

Please further refer to FIGS. 4 and 4A. The supporting arm 14 swings from upward to forward. When the supporting arm 14 swings to a predetermined position, the pushing portion 144 of the supporting arm 14 touches the ear portion 152 of the upper prop rack 15. As shown in FIG. 5, when the supporting arm 14 continues to swing, the pushing portion 144 pushes the ear portion 152 to make the upper prop rack 15 start to swing upward. When the supporting arm 14 swings to the other predetermined position, the guiding sheet 1451 of the supporting arm 14 touches the elastic engaging member 123, swings with the supporting arm 14 and presses the elastic engaging member 123 gradually to make the elastic engaging member 123 retreat inward. When a position of the fixing hole 1452 corresponds to a position of the elastic engaging member 123, the elastic engaging member 123 bounds up and disposed in the fixing hole 1452 so as to make the supporting arm 14 unswingable relative to the supporting rack 12. At the same time, the propping portion 143 of the supporting arm 14 abuts against a front face of the supporting rack 12 and is supported by the supporting rack 12 (the supporting arm 14 is in the operating position), the upper prop rack 15 swings to the passive position, and the lower prop rack 13 swings to the open position (as shown in FIG. 7).

Figure 8:
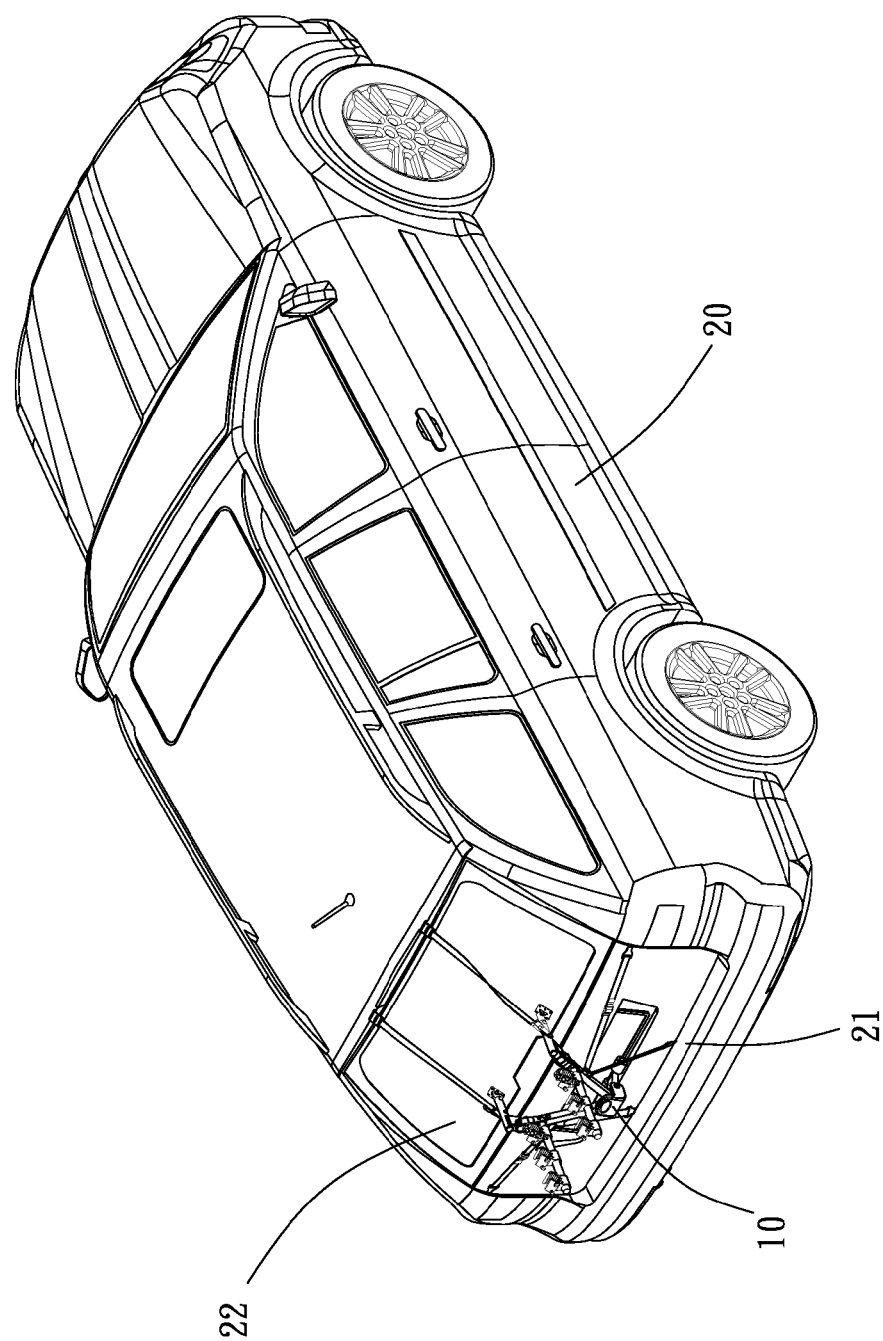
FIGS. 8 and 9 are drawings showing the present invention in use.
Figure 9:
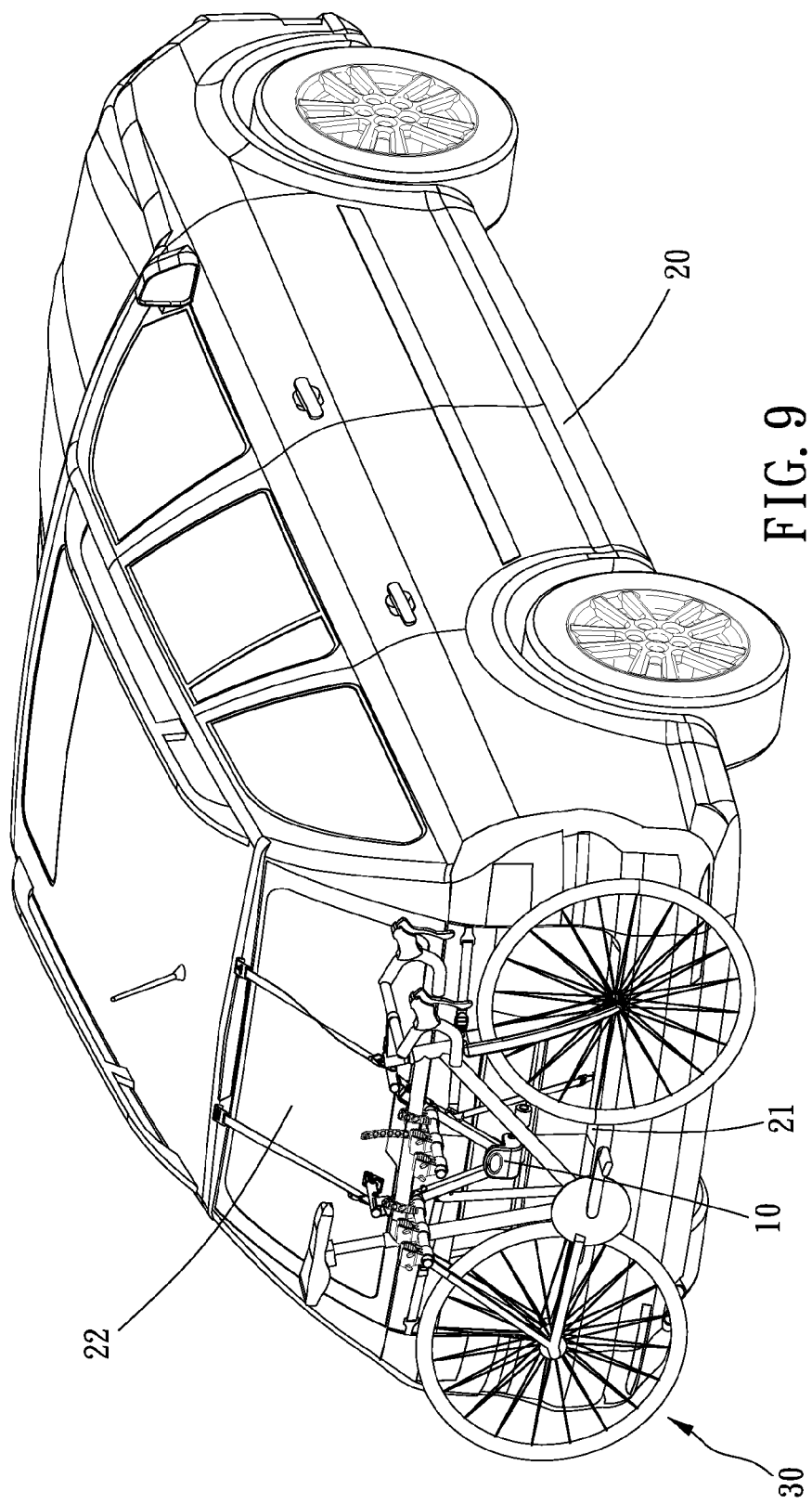

Then, the present invention can be mounted to the rear of the car 20 as shown in FIGS. 1, 8 and 9. The lower prop portion 131 of the lower prop rack 13 abuts against a bottom edge 21 in the rear of the car 20, the upper prop portion 151 of the upper prop rack 15 abuts against a rear windshield 22 or a trunk lid of the car 20. Then, fix the rear-mounted bicycle carrying rack for a vehicle 10 with a fastening tape or others, saddle the bicycle 30 on the two supporting arm 14 and position the bicycle 30, and then the mounting and operating process is accomplished.

On the other hand, if a user wants to put the present invention away, s/he can conduct the above-mentioned process to make the present invention return to the form as shown in FIG. 2. When the present invention is in the form of FIG. 2, its volume is quite small, and its height is quite low; therefore, it is convenient to be stored.

The rear-mounted bicycle carrying rack for a vehicle of the present invention has the following advantages:

1. The two supporting arms are supported respectively by a supporting rack but not by only one supporting rack, so the present invention provides strong structural strength and stable support.

2. The supporting arm and the upper prop member are independent of each other and can be positioned in parallel, so the height of the present invention after folded decreases largely. The supporting arm actuates the upper prop member to swing, so it is easy to operate the present invention.

3. There is no need of extra positioning device: when the bicycle is arranged on the supporting arms, a force of the supporting arms pressing downward provides the supporting racks with a downward force so as to abut against the base, and the force of the supporting arms pressing downward makes the pushing portion prop the upper prop rack upward.

4. The supporting racks support the bicycle via the supporting arms and the weight of the bicycle, so the present invention is not easy to be damaged.

What is claimed is:

1. A rear-mounted bicycle carrying rack for a vehicle, including:

a base, having a front side and a rear side, a connection between the front side and the rear side defining a first direction, the front side of the base having at least one first pivoting portion, at least one second pivoting portion formed on the rear side of the base;

two supporting racks, an end of each supporting rack pivoted to the first pivoting portion, the other end of each supporting rack having a third pivoting portion, each supporting rack being swingable about a first pivoting axle around the first pivoting portion, the first pivoting axle being parallel to the first direction, the two supporting racks being swingable on the same plane, the two supporting racks being movably changing between a first state which the two supporting racks gather together and are parallel to each other and a second state which the two supporting racks split and have an included angle therebetween, when the two supporting racks are in the first state, each supporting rack is substantially vertical, when the two supporting racks are in the second state, an included angle is formed between each supporting rack and a horizontal plane;

a lower prop rack, an end of the lower prop rack pivoted to the second pivoting portion so as to allow the lower prop rack to swing between a vertical position and an open position about a second pivoting axle relative to the base, the other end of the lower prop rack having a lower prop portion, when the lower prop rack is in the vertical position, the lower prop portion is above the base and vertical to the base, when the lower prop rack is in the open position, the lower prop portion is behind the second pivoting portion in a predetermined distance;

two supporting arms, an end of each supporting arm pivoted to the third pivoting portion of one of the supporting racks and being swingable between a close position and an operating position, the end of each supporting arm near the third pivoting portion having a propping portion and a pushing portion, when the supporting arm is in the close position, the supporting arm is behind the supporting rack, when the supporting arm swings forward from the close position to the operating position, the supporting arm is in front of the supporting rack, and the propping portion abuts against the supporting rack so that the supporting arm extends forward and is unswingable;

two upper prop racks, an end of each upper prop rack pivoted to the third pivoting portion of one of the supporting rack and being swingable between a beginning position and a passive position, the other end of each upper prop rack having an upper prop portion, when the upper prop rack is in the beginning position and the supporting arm is in the close position, the upper prop rack is located between the supporting arm and the supporting rack, when the supporting arm swings forward to make the pushing portion abut against the upper prop rack, the upper prop rack starts to be pushed by the supporting arm and swing toward the passive position, when the supporting arm is in the operating position, the upper prop rack is in the passive position and extends backward;

wherein when the supporting arm is in the operating position and the upper prop rack is in the passive position, the supporting arm and the upper prop rack are nonlinearly located.

2. The rear-mounted bicycle carrying rack for a vehicle of claim 1, wherein the base has a front wall and two lateral walls connected to two sides of the front wall, the front wall and the two lateral walls form a receiving space, the first pivoting portion is disposed on a face of the front wall facing the receiving space, and the second pivoting portion is connected between the two lateral walls.

3. The rear-mounted bicycle carrying rack for a vehicle of claim 2, wherein each face of each lateral wall facing the receiving space is provided with a blocking portion, when the two supporting racks are in the second state, a lower outer lateral face of each supporting rack abuts against the blocking portion and is unswingable.

4. The rear-mounted bicycle carrying rack for a vehicle of claim 1, wherein each supporting arm is substantially L-shaped and includes an abutting section and an extending section, the abutting section is pivoted to the third pivoting portion, when the supporting arm is in the close position, the abutting section is substantially perpendicular to the supporting rack, the extending section is substantially parallel to the supporting rack, and the propping portion and the pushing portion are located within the abutting section.

5. The rear-mounted bicycle carrying rack for a vehicle of claim 4, wherein when the supporting arm is in the operating position and the upper prop rack is in the passive position, the supporting arm and the upper prop rack are substantially parallel to each other, but a position of the supporting arm is lower than a position of the upper prop rack.

6. The rear-mounted bicycle carrying rack for a vehicle of claim 4, wherein the abutting section of the supporting arm includes three sequentially connected abutting walls, the three abutting walls form a space whose opening opposite to the extending section, the abutting wall in the middle is formed with a propping portion, at least one of the other two abutting walls has a fixing portion, the fixing portion includes a guiding sheet and a fixing hole, the guiding sheet is slanted, an outer wall of the supporting rack is protrudingly formed with an elastic engaging member, when the supporting arm is moved to the operating position, the elastic engaging member is pressed by the guiding sheet and temporarily retreats and enters the fixing hole so as to allow the supporting arm and the supporting rack to be fixed with each other.

7. The rear-mounted bicycle carrying rack for a vehicle of claim 1, wherein the upper prop portion of each upper prop rack is swingably disposed at the end of the upper prop rack remote from the third pivoting portion.

8. The rear-mounted bicycle carrying rack for a vehicle of claim 1, wherein a face of each supporting rack facing the other supporting rack has a positioning member, and the two supporting racks are fixable with each other via the two positioning members and fixedly positioned.

9. The rear-mounted bicycle carrying rack for a vehicle of claim 1, wherein two sides of each upper prop rack are provided with an ear portion respectively, and the ear portion is provided for the pushing portion of the supporting arm to push and abut thereagainst to allow the upper prop rack to swing upward.

\* \* \* \* \*